United States Patent
Fujii et al.

(10) Patent No.: US 10,942,472 B2
(45) Date of Patent: Mar. 9, 2021

(54) ELECTROPHOTOGRAPHY DEVICE DEVELOPMENT ROLL INCLUDING SHAFT, ELASTIC LAYER AND SURFACE LAYER

(71) Applicant: Sumitomo Riko Company Limited, Aichi (JP)

(72) Inventors: Kengo Fujii, Aichi (JP); Shuichi Egawa, Aichi (JP); Takeru Horiuchi, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 0 days.

(21) Appl. No.: 16/907,157

(22) Filed: Jun. 19, 2020

(65) Prior Publication Data

US 2020/0319574 A1    Oct. 8, 2020

Related U.S. Application Data

(63) Continuation of application No. PCT/JP2019/012346, filed on Mar. 25, 2019.

(30) Foreign Application Priority Data

Mar. 30, 2018 (JP) .............................. JP2018-067040

(51) Int. Cl.
*G03G 15/08* (2006.01)
*G03G 15/02* (2006.01)

(52) U.S. Cl.
CPC ..... *G03G 15/0818* (2013.01); *G03G 15/0233* (2013.01)

(58) Field of Classification Search
USPC ....................................................... 399/286
See application file for complete search history.

(56) References Cited

U.S. PATENT DOCUMENTS

| 2001/0033930 A1* | 10/2001 | Kodama | G03G 15/0818 428/375 |
| 2002/0119324 A1* | 8/2002 | Harashima | G03G 15/0233 428/423.3 |

FOREIGN PATENT DOCUMENTS

JP    4761546    8/2011

OTHER PUBLICATIONS

"International Search Report (Form PCT/ISA/210) of PCT/JP2019/012346," dated Jun. 4, 2019, with English translation thereof, pp. 1-4.

\* cited by examiner

*Primary Examiner* — Q Grainger
(74) *Attorney, Agent, or Firm* — JCIPRNET

(57) ABSTRACT

An electrophotography device development roller in which an increase in the electric charge of a toner is suppressed is provided. This electrophotography device development roller 10 is provided with a shaft 12, an elastic layer 14 formed on the outer circumference of the shaft 12, and a surface layer 16 formed on the outer circumference of the elastic layer 14. The surface layer 16 contains components (a) to (c) below. Component (a) a binder comprising acrylonitrile-butadiene rubber having an acrylonitrile amount of 30 mass % or more; component (b) an ion-conducting agent comprising at least one selected from a phosphonium salt and a pyridinium salt; and component (c) an electric charge regulator comprising an acrylic polymer having a silicone group or fluorine-containing group and a cationic group.

1 Claim, 1 Drawing Sheet

(a)
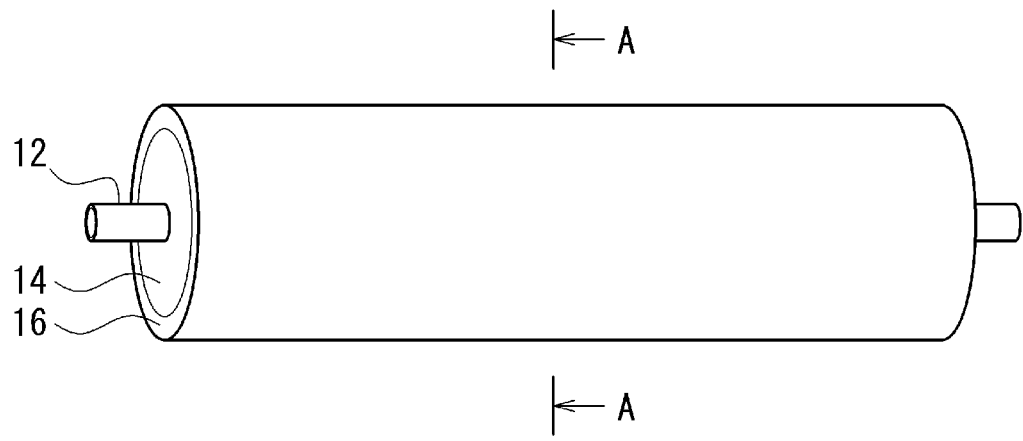
(b)
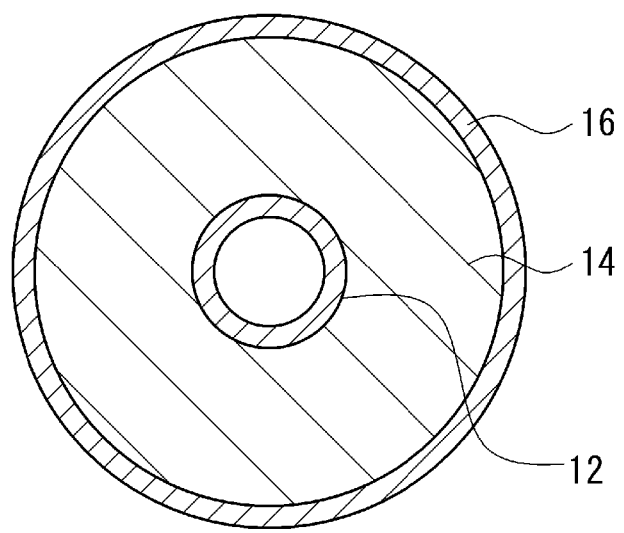

ELECTROPHOTOGRAPHY DEVICE DEVELOPMENT ROLL INCLUDING SHAFT, ELASTIC LAYER AND SURFACE LAYER

CROSS-REFERENCE TO RELATED APPLICATION

This application is a continuation application of International Application number PCT/JP2019/012346 on Mar. 25, 2019, which claims the priority benefit of Japan Patent Application No. 2018-067040, filed on Mar. 30, 2018. The entirety of each of the above-mentioned patent applications is hereby incorporated by reference herein and made a part of this specification.

BACKGROUND

Technical Field

The present application relates to an electrophotography device development roller that is suitably used in an electrophotography device such as a copying machine, a printer, and a facsimile which uses an electrophotographic method.

Background Art

In an electrophotography device, a development roller has a role of adding a sufficient amount of a toner and transporting an amount of toner necessary for printing to a photoreceptor. For example, Patent Literature 1 discloses an electrophotography device development roller which includes at least one elastic layer on a shaft core and at least one surface layer on the outer circumference thereof, wherein the surface layer is made of a thermoplastic resin and the thermoplastic resin is selected from the group consisting of a fluorine resin, a thermoplastic polyimide, a polyamide, a polyethylene, a polypropylene and a polystyrene.

LITERATURE OF RELATED ART

Patent Literature

[Patent Literature 1]
Japanese Patent No. 4761546

Examples of a toner charging method include a positive charging method in which a toner is positively charged and a negative charging method in which a toner is negatively charged. The positive charging method has problems in toner transportability and image quality because the amount of electric charge of the positively charged toner is high and the development roller may retain more of the toner than necessary.

An objective to be achieved by the present application is to provide an electrophotography device development roller in which an increase in the electric charge of a toner is minimized.

SUMMARY

In order to address the above problems, an electrophotography device development roller according to the present application includes a shaft, an elastic layer formed on an outer circumference of the shaft, and a surface layer formed on an outer circumference of the elastic layer, wherein the surface layer contains the following (a) to (c):

(a) a binder made of an acrylonitrile-butadiene rubber having an acrylonitrile amount of 30 mass % or more,
(b) an ion-conducting agent made of at least one selected from among phosphonium salts and pyridinium salts, and
(c) an electric charge regulator made of an acrylic polymer having a silicone group or a fluorine-containing group, and a cationic group.

In one of the exemplary embodiments, the acrylonitrile amount of the binder (a) is 40 mass % or more.

In one of the exemplary embodiments, the ion-conducting agent (b) is a phosphonium salt represented by the following General Formula (1):

[Chem. 1]

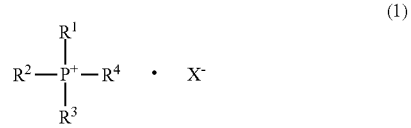

(1)

In Formula (1), $R^1$ to $R^3$ are an organic group having 1 to 4 carbon atoms, $R^4$ is an organic group having 4 to 12 carbon atoms, and $X^-$ is an anion.

In one of the exemplary embodiments, the electric charge regulator (c) is an electric charge regulator made of an acrylic polymer having a silicone group and a cationic group.

In one of the exemplary embodiments, the cationic group of the electric charge regulator (c) is a quaternary ammonium cation.

BRIEF DESCRIPTION OF DRAWINGS (a) of FIG. 1 shows an appearance schematic view of an electrophotography device development roller according to one embodiment of the present application, and (b) of FIG. 1 shows a cross-sectional view taken along the line A-A.

DESCRIPTION OF EMBODIMENTS

According to the electrophotography device development roller of the present application, when the surface layer contains the above (a) to (c), an increase in the electric charge of the toner is minimized. Thereby, the effects of stabilizing toner transportability and improving image quality can be obtained.

An electrophotography device development roller according to the present application (hereinafter, simply referred to as a development roller) will be described in detail. (a) of FIG. 1 shows an appearance schematic view of an electrophotography device development roller according to one embodiment of the present application, and (b) of FIG. 1 shows a cross-sectional view taken along the line A-A.

A development roller 10 includes a shaft 12, an elastic layer 14 formed on the outer circumference of the shaft 12, and a surface layer 16 formed on the outer circumference of the elastic layer 14. The elastic layer 14 is a layer (base layer) serving as a base of the development roller 10. The surface layer 16 is a layer that appears on the surface of the development roller 10. In addition, although not particularly shown, as necessary, an intermediate layer such as a resistance adjustment layer may be formed between the elastic layer 14 and the surface layer 16.

The surface layer 16 contains the following (a) to (c).

(a) A binder made of an acrylonitrile-butadiene rubber having an acrylonitrile amount of 30 mass % or more (b) An ion-conducting agent made of at least one selected from among phosphonium salts and pyridinium salts (c) An electric charge regulator made of an acrylic polymer having a silicone group or a fluorine-containing group, and a cationic group.

(a) is a binder made of acrylonitrile-butadiene rubber (NBR) and has an acrylonitrile amount of at least 30 mass % or more. When the acrylonitrile amount of (a) is less than 30 mass %, an interaction with the ion-conducting agent of (b) is weak and an amount of electric charge increases due to bleeding of the ion-conducting agent of (b). The acrylonitrile amount of (a) is more preferably 40 mass % or more.

(b) is an ion-conducting agent, and is made of at least one selected from among phosphonium salts and pyridinium salts. Since the cation does not have a fluorine-containing group, a silicone group, or the like, (b) is uniformly arranged on the entire surface layer 16.

The phosphonium salt is a quaternary phosphonium salt, and has one or two or more organic groups having 1 to 20 carbon atoms in the cation. Examples of organic groups include aliphatic hydrocarbon groups (alkyl groups) such as a methyl group, an ethyl group, a propyl group, a butyl group, a hexyl group, an octyl group, and a decyl group, or aromatic hydrocarbon groups (aryl groups) such as a phenyl group and an xylyl group.

Examples of anions of phosphonium salts include a halogen ion, $ClO_4^-$, $BF_4^-$, $SO_4^{2-}$, $HSO_4^-$, $C_2H_5SO_4^-$, $CF_3COO^-$, $CF_3SO_3^-$, $(CF_3SO_2)_2N^-$, $PF_6^-$, $(CF_3CF_2SO_2)_2N^-$, $CF_3(CF_2)_3SO_3^-$, $(CF_3SO_2)_3C^-$, and $CF_3(CF_2)_2COO^-$. Regarding an anion of a phosphonium salt, a fluorine-containing anion is preferable because it has excellent toner electric chargeability under a high temperature and high humidity environment (under an HH environment). Regarding the anion, $CF_3COO^-$, $CF_3SO_3^-$, $(CF_3SO_2)_2N^-$, $PF_6^-$, $(CF_3CF_2SO_2)_2N^-$, $CF_3(CF_2)_3SO_3^-$, $(CF_3SO_2)_3C^-$, or $CF_3(CF_2)_2COO^-$ is particularly preferable.

The phosphonium salt can be represented by, for example, the following General Formula (1).

[Chem. 2]

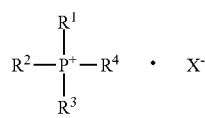

(1)

In Formula (1), $R^1$ to $R^4$ are an organic group having 1 to 20 carbon atoms. $R^1$ to $R^4$ may be the same organic group, or some or all thereof may be different organic groups. $X^-$ is an anion. Regarding the phosphonium salt, those in which $R^1$ to $R^3$ are an organic group having 1 to 4 carbon atoms, and $R^4$ is an organic group having 4 to 12 carbon atoms in Formula (1) are preferable in order to stabilize cations.

The pyridinium salt may be an unsubstituted pyridinium salt having no substituents on any carbon atoms of an aromatic ring and having no N-substituent, a substituent-containing pyridinium salt having 1 or 2 or more organic groups having 1 to 20 carbon atoms at an arbitrary carbon atom of an aromatic ring and having no N-substituent, or a substituent-containing pyridinium salt having no substituents on any carbon atoms of an aromatic ring and having an organic group having 1 to 20 carbon atoms at the N position.

Examples of organic groups of pyridinium salts include those exemplified as organic groups of phosphonium salts. Examples of anions of pyridinium salts include those exemplified as anions of phosphonium salts.

The pyridinium salt of (b) can be represented by, for example, the following General Formula (2).

[Chem. 3]

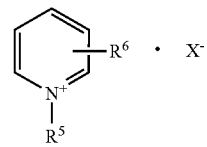

(2)

In Formula (2), $R^5$ is a hydrogen atom or an organic group having 1 to 20 carbon atoms. $R^6$ indicates that a substituent may be present on an arbitrary one or two or more carbon atoms of an aromatic ring, and is a hydrogen atom or an organic group having 1 to 20 carbon atoms. $X^-$ is an anion. Regarding the pyridinium salt, those in which $R^5$ is an organic group having 1 to 8 carbon atoms, and $R^6$ is a substituent at the 4-position and an organic group having 1 to 10 carbon atoms in Formula (2) are preferable in order to stabilize cations.

In the surface layer 16, the content of (b) is preferably 0.1 parts by mass or more with respect to 100 parts by mass of the binder of (a) in order to obtain excellent electric chargeability of the toner. The content is more preferably 0.5 parts by mass or more, and still more preferably 1.0 part by mass or more. In addition, the content is preferably 10 parts by mass or less with respect to 100 parts by mass of the binder of (a) because in this case bleeding of (b) is easily minimized. The content is more preferably 7.0 parts by mass or less, and still more preferably 5.0 parts by mass or less.

(c) is an electric charge regulator and is made of an acrylic polymer. Since (c) has a silicone group or a fluorine group, it is unevenly distributed on the side of the surface of the surface layer 16. In addition, it functions as an electric charge regulator because it is unevenly distributed on the side of the surface of the surface layer 16 and has a cationic group. Examples of (c) include (c1) an acrylic polymer having a silicone group and a cationic group, (c2) an acrylic polymer having a fluorine-containing group and a cationic group, and (c3) an acrylic polymer having a silicone group, a fluorine-containing group, and a cationic group. Regarding (c), these may be used alone or two or more thereof may be used in combination. Examples of acrylic polymers represents a (meth)acrylate copolymer, a (meth)acrylamide copolymer, and a copolymer of (meth)acrylate and (meth)acrylamide.

(c1) can be obtained by copolymerizing a (meth)acrylate having a silicone group and/or an (meth)acrylamide having a silicone group, and a (meth)acrylate having a cationic group and/or a (meth)acrylamide having a cationic group. In addition to the above components, (c1) may be a copolymer that further includes one or two or more non-modified (meth)acrylates or non-modified (meth)acrylamides having no silicone groups, fluorine groups, or cationic groups as a copolymerization component. When a non-modified (meth) acrylate or non-modified (meth)acrylamide is included as a copolymerization component, this is advantageous in terms of compatibility with a matrix polymer.

The (meth)acrylate having a silicone group and the (meth) acrylamide having a silicone group are organopolysiloxanes having one or two or more (meth)acryloyl groups. The organopolysiloxane has an organic group in addition to a (meth)acryloyl group. The organic group is a monovalent substituted or unsubstituted hydrocarbon group. Examples of unsubstituted hydrocarbon groups include alkyl groups such as a methyl group, an ethyl group, a propyl group, a butyl group, a hexyl group, and a dodecyl group, aryl groups such as a phenyl group, and aralkyl groups such as a β-phenylethyl group and a 3-phenylpropyl group. Examples of substituted hydrocarbon groups include a chloromethyl group and a 3,3,3-trifluoropropyl group. Regarding the organopolysiloxane, those having a methyl group as an organic group are generally frequently used because they are easily synthesized. The organopolysiloxane is preferably linear but may be branched or cyclic. The molecular weight of the organopolysiloxane is not particularly limited, and those having a number average molecular weight in a range of 200 to 30,000 can be suitably used. A (meth)acryloyl group generally refers to an acryloyl group and a methacryloyl group. In addition, a (meth)acrylate generally refers to an acrylate and a methacrylate. In addition, a (meth)acrylamide generally refers to an acrylamide and a methacrylamide.

In the (meth)acrylate having a cationic group and the (meth)acrylamide having a cationic group, examples of cationic groups include a quaternary ammonium cation, a quaternary phosphonium cation, a pyridinium cation, and an imidazolium cation. These may include, as cations, only one or two or more thereof. Among these, a quaternary ammonium cation is particularly preferable because in this case an increase in the toner electric charge is minimized.

A (meth)acrylate having a quaternary ammonium cationic group and a (meth)acrylamide having a quaternary ammonium cationic group can be represented by, for example, the following General Formula (3).

[Chem. 4]

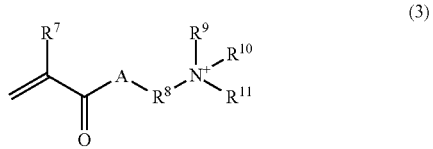

(3)

In Formula (3), A is O or NH, $R^7$ is a hydrogen atom or a methyl group, $R^8$ is a divalent organic group having 1 to 8 carbon atoms, $R^9$ to $R^{10}$ are a hydrogen atom or an organic group having 1 to 20 carbon atoms or a ring structure having 4 to 20 carbon atoms in which $R^9$ to $R^{10}$ are chemically bonded, and $R^{11}$ is an organic group having 1 to 20 carbon atoms. Examples of organic groups include aliphatic hydrocarbon groups (alkyl groups) such as a methyl group, an ethyl group, a propyl group, a butyl group, a hexyl group, an octyl group, and a decyl group, and aromatic hydrocarbon groups (aryl groups) such as a phenyl group and an xylyl group.

Examples of anions that form a pair with cations of a cationic group include anions such as a halogen ion, $ClO_4^-$, $BF_4^-$, $SO_4^{2-}$, $HSO_4^-$, $C_2H_5SO_4^-$, $CF_3COO^-$, $CF_3SO_3^-$, $(CF_3SO_2)_2N^-$, $PF_6^-$, $(CF_3CF_2SO_2)_2N^-$, $CF_3(CF_2)_3SO_3^-$, $(CF_3SO_2)_3C^-$, and $CF_3(CF_2)_2COO^-$. Among these, a fluorine-containing anion is preferable because it has excellent toner electric chargeability under a high temperature and high humidity environment (under an HH environment). Regarding the anion, $CF_3COO^-$, $CF_3SO_3^-$, $(CF_3SO_2)_2N^-$, $PF_6^-$, $(CF_3CF_2SO_2)_2N$, $CF_3(CF_2)_3SO_3^-$, $(CF_3SO_2)_3C^-$, or $CF_3(CF_2)_2COO^-$ is particularly preferable.

In (c1), examples of copolymerizable non-modified (meth)acrylates include alkyl (meth)acrylates and hydroxyalkyl (meth)acrylates. Examples of alkyl (meth)acrylates include methyl (meth)acrylate, ethyl (meth)acrylate, propyl (meth)acrylate, butyl (meth)acrylate, and 2-ethylhexyl (meth)acrylate. Examples of hydroxyalkyl (meth)acrylates include hydroxyethyl (meth)acrylate, hydroxypropyl (meth)acrylate, and hydroxybutyl (meth)acrylate. Among these, methyl (meth)acrylate is preferable in consideration of copolymerization reactivity and the like.

In (c1), examples of copolymerizable non-modified (meth)acrylamides include (meth)acrylamide, alkyl (meth)acrylamide, and hydroxyalkyl (meth)acrylamide. Examples of alkyl (meth)acrylamides include methyl (meth)acrylamide, ethyl (meth)acrylamide, propyl (meth)acrylamide, butyl (meth)acrylamide, and 2-ethylhexyl (meth)acrylamide. Examples of hydroxyalkyl (meth)acrylamides include hydroxyethyl (meth)acrylamide, hydroxypropyl (meth)acrylamide, and hydroxybutyl (meth)acrylamide. Among these, methyl (meth)acrylamide is preferable in consideration of copolymerization reactivity.

(c2) can be obtained by copolymerizing a (meth)acrylate having a fluorine-containing group and/or a (meth)acrylamide having a fluorine-containing group, and a (meth)acrylate having a cationic group and/or a (meth)acrylamide having a cationic group. In addition to the above components, (c2) may be a copolymer that further includes one or two or more non-modified (meth)acrylates or non-modified (meth)acrylamides having no silicone groups, fluorine groups, or cationic groups as a copolymerization component.

In the (meth)acrylate having a fluorine-containing group and the (meth)acrylamide having a fluorine-containing group, examples of fluorine-containing groups include a fluoroalkyl group having 1 to 20 carbon atoms. The fluoroalkyl group may be a perfluoroalkyl group in which all hydrogen atoms of an alkyl group are substituted with fluorine atoms or a fluoroalkyl group in which some hydrogen atoms of an alkyl group are substituted with fluorine atoms. Among these, a perfluoroalkyl group is preferable because it is unevenly distributed on the surface of the surface layer 16.

Examples of fluoroalkyl groups having 1 to 20 carbon atoms include a trifluoromethyl group, a pentafluoroethyl group, a heptafluoropropyl group, a nonafluorobutyl group, a trifluoroethyl group, a pentafluoropropyl group, and a heptafluoro butyl group.

The (meth)acrylate having a fluorine-containing group and the (meth)acrylamide having a fluorine-containing group can be represented by, for example, the following General Formula (4).

[Chem. 5]

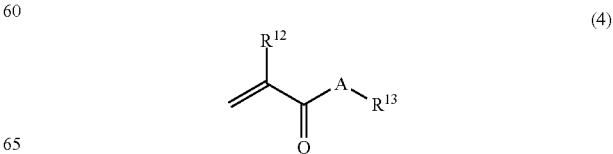

(4)

In Formula (4), A is O or NH, $R^{12}$ is a hydrogen atom or a methyl group, and $R^{13}$ is a fluoroalkyl group having 1 to 20 carbon atoms.

(c3) can be obtained by copolymerizing a (meth)acrylate having a silicone group and/or a (meth)acrylamide having a silicone group, and a (meth)acrylate having a fluorine-containing group and/or a (meth)acrylamide having a fluorine-containing group, and a (meth)acrylate having a cationic group and/or a (meth)acrylamide having a cationic group. In addition to the above components, (c3) may be a copolymer that further includes one or two or more non-modified (meth)acrylates or non-modified (meth)acrylamides having no silicone groups, fluorine groups, or cationic groups as a copolymerization component.

Examples of (meth)acrylates having a silicone group and (meth)acrylamides having a silicone group include those exemplified in (c1). Examples of (meth)acrylates having a fluorine-containing group and (meth)acrylamides having a fluorine-containing group include those exemplified in (c2). Examples of (meth)acrylates having a cationic group and (meth)acrylamides having a cationic group include those exemplified in (c1).

In (c), the content of the silicone group is preferably in a range of 0.01 to 60 mol % because in this case (c) is unevenly distributed on the surface of the surface layer 16. The content is more preferably 0.05 to 50 mol %, and still more preferably 0.1 to 30 mol %. In addition, the content of the fluorine-containing group is preferably in a range of 0.01 to 60 mol % because (c) is unevenly distributed on the surface of the surface layer 16. The content is more preferably 0.05 to 50 mol %, and still more preferably 0.1 to 30 mol %. In addition, the content of the cationic group is preferably in a range of 0.01 to 60 mol % because the electric charge regulation becomes better. The content is more preferably 0.05 to 50 mol %, and still more preferably 0.1 to 30 mol %. Each content can be measured through GC-MS analysis, NMR analysis, or the like.

In the surface layer 16, the content of (c) is preferably 0.1 parts by mass or more with respect to 100 parts by mass of the binder of (a) because toner electric chargeability is excellent. The content is more preferably 0.5 parts by mass or more, and still more preferably 1.0 part by mass or more. In addition, the content is preferably 30 parts by mass or less with respect to 100 parts by mass of the binder of (a) because in this case bleeding of (c) is easily minimized. The content is more preferably 20 parts by mass or less, and still more preferably 10 parts by mass or less.

The surface layer 16 may include other polymer components in a range that do not influence the present application in addition to (a) to (c). In addition, it may contain particles for forming roughness for forming surface roughness. In addition, additives may be contained. Examples of additives include a conductive agent, a filler, a stabilizer, a UV absorber, a lubricant, a mold release agent, a dye, a pigment, and a flame retardant.

The surface layer 16 can be formed by applying a material for forming the surface layer 16 to the outer circumferential surface of the elastic layer 14, and performing a heat treatment, a crosslinking treatment, or the like as necessary. The material for forming the surface layer 16 contains (a) to (c). The material for forming the surface layer 16 may contain additives to be added as necessary in addition to (a) to (c). In addition, a diluting solvent may be contained. Examples of diluting solvents include ketone solvents such as methyl ethyl ketone (MEK) and methyl isobutyl ketone, alcohol solvents such as isopropyl alcohol (IPA), methanol, and ethanol, hydrocarbon solvents such as hexane and toluene, acetate solvents such as ethyl acetate and butyl acetate, ether solvents such as diethyl ether and tetrahydrofuran, and water.

When the surface layer 16 contains the above (a) to (c), an increase in the electric charge of the toner is minimized. Thereby, the effects of stabilizing toner transportability and improving image quality can be obtained. This is thought to be caused by the fact that, when a carbon-carbon double bond or an acrylonitrile group of a binder interacts with and attracts a phosphonium cation or a pyridinium cation of the ion-conducting agent, and a hydrocarbon chain derived from a butadiene moiety of a binder interacts with and attracts a hydrocarbon chain derived from a (meth)acryloyl group of an electric charge regulator, movement of anions of the ion-conducting agent to the surface of the surface layer 16 is suppressed and bleeding of the ion-conducting agent and an increase in the electric charge are suppressed. When the ion-conducting agent is a phosphonium salt or a pyridinium salt, the above effects can be obtained, and for example, in the case of ammonium salt, the above effects cannot be obtained.

The thickness of the surface layer 16 is not particularly limited, but is preferably in a range of 0.1 to 50 μm, more preferably in a range of 0.1 to 30 μm, and still more preferably in a range of 0.3 to 20 μm. The thickness of the surface layer 16 can be measured by observing the cross section using a laser microscope (for example, "VK-9510" commercially available from Keyence Corporation). For example, the thickness can be represented by an average of distances from the surface of the elastic layer 14 to the surface of the surface layer 16 measured at five arbitrary positions.

The surface layer 16 can be adjusted to have a predetermined volume resistivity depending on the type of the binder, the type of the ion-conducting agent, the formulation amount, and the like. The volume resistivity of the surface layer 16 may be appropriately set in a range of $10^7$ to $10^{14}$ Ω·cm, $10^8$ to $10^{13}$ Ω·cm, or $10^9$ to $10^{12}$ Ω·cm. The volume resistivity can be measured according to JIS K6911.

The elastic layer 14 contains a crosslinked rubber. The elastic layer 14 is formed of a conductive rubber composition containing an uncrosslinked rubber. The crosslinked rubber is obtained by cross-linking uncrosslinked rubber. The uncrosslinked rubber may be a polar rubber or a non-polar rubber.

The polar rubber is a rubber having a polar group, and examples of polar groups include a chloro group, a nitrile group, a carboxyl group, and an epoxy group. Specific examples of polar rubbers include hydrin rubber, nitrile rubber (NBR), urethane rubber (U), acrylic rubber (a copolymer of acrylic ester and 2-chloroethyl vinyl ether, ACM), chloroprene rubber (CR), and epoxidized natural rubber (ENR). Among polar rubbers, hydrin rubber or nitrile rubber (NBR) is more preferable because the volume resistivity is particularly easily reduced.

Examples of hydrin rubbers include an epichlorohydrin homopolymer (CO), an epichlorohydrin-ethylene oxide binary copolymer (ECO), an epichlorohydrin-allyl glycidyl ether binary copolymer (GCO), and an epichlorohydrin-ethylene oxide-allyl glycidyl ether terpolymer (GECO).

Examples of urethane rubbers include a polyether type urethane rubber having an ether bond in the molecule. The polyether type urethane rubber can be produced by a reaction between a polyether having a hydroxyl group at both ends and a diisocyanate. The polyether is not particularly limited, and examples thereof include polyethylene glycol and polypropylene glycol. The diisocyanate is not particularly limited, and examples thereof include tolylene diisocyanate and diphenylmethane diisocyanate.

Examples of non-polar rubbers include silicone rubber (Q), isoprene rubber (IR), natural rubber (NR), styrene butadiene rubber (SBR), and butadiene rubber (BR). Among non-polar rubbers, a silicone rubber is more preferable because it has low hardness and is less likely to be fatigued (has excellent elastic recovery).

Examples of crosslinking agents include a resin crosslinking agent, a sulfur crosslinking agent, a peroxide crosslinking agent, and a dechlorination crosslinking agent. These crosslinking agents may be used alone or two or more thereof may be used in combination.

Examples of resin crosslinking agents include conventionally known resin crosslinking agents such as a phenolic resin, a urea resin, an amino resin, a guanaquinine resin, a xylene resin, an unsaturated polyester resin, a diallyl phthalate resin, an epoxy resin, and a urethane resin.

Examples of sulfur crosslinking agents include conventionally known sulfur crosslinking agents such as powdered sulfur, precipitated sulfur, colloidal sulfur, surface-treated sulfur, insoluble sulfur, sulfur chloride, a thiuram-based vulcanization accelerator, and a polymer polysulfide.

Examples of peroxide crosslinking agents include conventionally known peroxide crosslinking agents such as a peroxyketal, dialkyl peroxide, peroxyester, ketone peroxide, peroxydicarbonate, diacyl peroxide, and hydroperoxide.

Examples of dechlorination crosslinking agents include a dithiocarbonate compound. More specifically, quinoxaline-2,3-dithiocarbonate, 6-methylquinoxaline-2,3-dithiocarbonate, 6-isopropylquinoxaline-2,3-dithiocarbonate, 5,8-dimethylquinoxaline-2,3-dithiocarbonate, and the like may be exemplified.

The formulation amount of the crosslinking agent is preferably in a range of 0.1 to 2 parts by mass, more preferably in a range of 0.3 to 1.8 parts by mass, and still more preferably in a range of 0.5 to 1.5 parts by mass with respect to 100 parts by mass of the uncrosslinked rubber in order to prevent bleeding.

When a dechlorination crosslinking agent is used as the crosslinking agent, a dechlorination crosslinking accelerator may be used in combination. Examples of dechlorination crosslinking accelerators include 1,8-diazabicyclo (5,4,0) undecene-7 (hereinafter abbreviated as a DBU) and its weak acid salts. The dechlorination crosslinking accelerator may be used in the form of DBU but is preferably used in the form of its weak acid salts in consideration of handling. Examples of weak acid salts for DBU include its carbonate, stearate, 2-ethylhexylate, benzoate, salicylate, 3-hydroxy-2-naphthoate, phenolic resin salt, 2-mercaptobenzothiazole salt, and 2-mercaptobenzimidazole salt.

The content of the dechlorination crosslinking accelerator is preferably in a range of 0.1 to 2 parts by mass, more preferably in a range of 0.3 to 1.8 parts by mass, and still more preferably in a range of 0.5 to 1.5 parts by mass with respect to 100 parts by mass of the uncrosslinked rubber in order to prevent bleeding.

In order to impart conductivity, conventionally known conductive agents such as carbon black, graphite, $c-TiO_2$, $c-ZnO$, $c-SnO_2$ (c- means conductivity), and an ion-conducting agent (a quaternary ammonium salt, a borate, a surfactant, and the like) can be appropriately added to the elastic layer 14. In addition, various additives may be appropriately added as necessary. Examples of additives include a lubricant, a vulcanization accelerator, an anti-aging agent, an optical stabilizer, a viscosity adjusting agent, a processing aid, a flame retardant, a plasticizer, a foaming agent, a filler, a dispersant, an anti-foaming agent, a pigment, and a mold release agent.

The elastic layer 14 can be adjusted to have a predetermined volume resistivity depending on the type of the crosslinked rubber, the formulation amount of the ion-conducting agent, formulating with an electron-conducting agent, and the like. The volume resistivity of the elastic layer 14 may be appropriately set in a range of $10^2$ to $10^{10}$ Ω·cm, $10^3$ to $10^9$ Ω·cm, or $10^4$ to $10^8$ Ω·cm depending on applications and the like.

The thickness of the elastic layer 14 is not particularly limited, but may be appropriately set in a range of 0.1 to 10 mm depending on applications and the like.

The elastic layer 14 can be produced, for example, as follows. First, the shaft 12 is coaxially disposed in a hollow part of a roller forming mold, an uncrosslinked conductive rubber composition is injected, heated and cured (crosslinked), and demolding is then performed, or an uncrosslinked conductive rubber composition is extruded and molded on the surface of the shaft 12, and thus the elastic layer 14 is formed on the outer circumference of the shaft 12.

The shaft 12 is not particularly limited as long as it has conductivity. Specific examples thereof include a solid body made of a metal such as iron, stainless steel, and aluminum and a metal core formed of a hollow body. An adhesive, a primer, and the like may be applied to the surface of the shaft 12 as necessary. That is, the elastic layer 14 may be adhered to the shaft 12 with an adhesive layer (primer layer) therebetween. As necessary, the adhesive, the primer, and the like may be made conductive.

EXAMPLES

The present application will be described below in detail with reference to examples and comparative examples.

Examples 1 to 6 and Comparative Examples 1 to 5

<Preparation of Composition for Elastic Layer>

A conductive silicone rubber (commercially available from Shin-Etsu Chemical Co., Ltd., "X-34-264A/B, mixing mass ratio A/B=1/1") was mixed using a static mixer to prepare a composition for an elastic layer.

<Preparation of Elastic Layer>

A solid cylindrical iron bar with a diameter of 6 mm was prepared as a shaft, and an adhesive was applied to the outer circumferential surface. The shaft was set in a hollow space of a roller forming mold, the prepared composition for an elastic layer was then injected in to the hollow space and heated and cured at 190° C. for 30 minutes, and demolding was performed. Thereby, a roller-like elastic layer (with a thickness of 3 mm) made of a conductive silicone rubber was formed along the outer circumferential surface of the shaft.

<Preparation of Surface Layer>

According to formulation proportions (parts by mass) shown in Table 1, a binder (NBR), an ion-conducting agent, an electric charge regulator, and a crosslinking agent were blended and the concentration was adjusted using a diluting solvent (MIBK) so that the concentration of the solid content was 14 mass %, and thereby a composition for a surface layer was prepared. Then, the composition for a surface layer was roller-coated on the outer circumferential surface of the elastic layer and heated, and thereby a surface layer (with a thickness of 10 μm) was formed on the outer circumference of the elastic layer. Thereby, a development roller was prepared.

Materials used as a surface layer material were as follows.
(Binder)
NBR <1>: "JSR N220S" commercially available from JSR Corporation, acrylonitrile content 41.5 mass %
NBR <2>: "JSR N230SL" commercially available from JSR Corporation, acrylonitrile content 35.0 mass %
NBR <3>: "JSR N215SL" commercially available from JSR Corporation, acrylonitrile content 48.0 mass %
NBR <4>: "JSR N250S" commercially available from JSR Corporation, acrylonitrile content 19.5 mass %
(Crosslinking Agent)
"5592" commercially available from DIC Corporation
(Ion-Conducting Agent)
Ion-conducting agent <1>: "tetrabutylphosphonium=bis(trifluoromethanesulfonyl)imide" commercially available from Wako Pure Chemical Industries, Ltd.
Ion-conducting agent <2>: "1-octyl-4-methylpyridinium=bis(trifluoromethanesulfonyl)imide" commercially available from Wako Pure Chemical Industries, Ltd.
Ion-conducting agent <3>: "trimethylhexyl ammonium bis(trifluoromethanesulfonyl)imide" commercially available from Wako Pure Chemical Industries, Ltd.
(Electric Charge Regulator)
Examples of the electric charge regulator are the following synthetic products such as synthesis of electric charge regulators <1> to <4>
(Synthesis of Electric Charge Regulator <1>)
A dimethylaminopropyl acrylamide (commercially available from KOHJIN) was reacted with methyl iodide to obtain an acrylamide having a cationic group composed of a quaternary ammonium cation (anion=iodionium ion). Then, this was reacted with bis(trifluoromethanesulfonyl)imide lithium to obtain an acrylamide having a cationic group in which an anion was a bis(trifluoromethanesulfonyl)imide anion and a cation was a quaternary ammonium cation. Then, in the presence of a polymerization initiator, the acrylamide having a cationic group, an acrylic modified silicone compound ("X-22-174DX" commercially available from Shin-Etsu Chemical Co., Ltd.), 2-hydroxyethyl methacrylate, and methyl methacrylate were copolymerized in MIBK at a molar ratio of 25.48:0.36:13:61.16, and thereby an acrylic polymer having a silicone group and a cationic group was obtained.

Polymerization initiator: dimethyl 1,1'-azobis(1-cyclohexanecarboxylate)
(Synthesis of Electric Charge Regulator <2>)
In the polymerization reaction when the acrylic polymer was synthesized, 2-(perfluorohexyl)ethyl acrylate ("R-1620" commercially available from Daikin Industries, Ltd.) was used in place of the acrylic modified silicone compound, an acrylamide having a cationic group, 2-(perfluorohexyl)ethyl acrylate, 2-hydroxyethyl methacrylate, and methyl methacrylate were copolymerized in MIBK at a molar ratio of 25.48:13:13:48.52, and thereby an acrylic polymer having a fluorine-containing group and a cationic group was obtained.
(Synthesis of Electric Charge Regulator <3>)
In the polymerization reaction when the acrylic polymer was synthesized, an acrylamide having a cationic group, an acrylic modified silicone compound, 2-(perfluorohexyl)ethyl acrylate, 2-hydroxyethyl methacrylate, and methyl methacrylate were copolymerized in MIBK at a molar ratio of 25.48:0.36:13:13:48.16, and thereby an acrylic polymer having a silicone group, a fluorine-containing group, and a cationic group was obtained.
(Synthesis of Electric Charge Regulator <4>)
An acrylic polymer having a silicone group (and having no cationic group) was obtained in the same manner as in the synthesis of electric charge regulator <1> except that no acrylamide having a cationic group was used in the polymerization reaction when the acrylic polymer was synthesized.

The toner electric chargeability of the prepared development roller was evaluated. In addition, a sheet-like sample (with a thickness of 2 mm) was prepared from the prepared composition for a surface layer, and the bleed resistance was evaluated. The formulation composition (parts by mass) of the surface layer materials and the evaluation results are shown in the following table.
(Toner Electric Chargeability)
The development roller was cured under an LL environment (10° C.×10% RH) for 4 hours, and then incorporated into a commercially available color laser printer ("HL-L9310CDW" commercially available from Brother Industries, Ltd.), and solid white images were formed. Next, while a suction port of a suction type electrostatic charge measuring device was pressed against the development roller, a toner on the development roller before development was sucked, and the toner was collected in a filter in an inner cylinder of the device. The inner cylinder was electrostatically shielded from the outside. A toner charge amount accumulated in the filter was measured using a connected electrometer ("6517A" commercially available from KEITHLEY), and a toner charge amount per area Q (μC/cm$^2$) was calculated from the area of the surface of the roller from which the toner was sucked. In addition, a toner transport amount M (g/cm$^2$) was calculated from the area of the surface of the roller on which the toner was absorbed and the amount of absorption (an increase in the weight of the filter). Based on these values, Q/M=toner charge amount/toner transport amount (μC/g) was calculated.

In addition, Q/M=toner charge amount/toner transport amount (μC/g) was calculated in the same manner as in each development roller after curing under an HH environment (32.5° C.×85% RH) for 4 hours.

Under an LL environment, those in which the Q/M was in a range of 60 to 80 μC/g were evaluated as "○" which indicates excellent electric charge regulation, and those in which the Q/M was above or below this range were evaluated as "x" which indicates inferior electric charge regulation.

Under an HH environment, those in which the Q/M was in a range of 40 to 60 μC/g were evaluated as "○" which indicates excellent electric charge regulation, and those in which the Q/M was above or below this range were evaluated as "x" which indicates inferior electric charge regulation.
(Bleed Resistance)
The prepared sheet-like sample was left under an environment of 50° C.×95% RH for 7 days, and the surface thereof was then observed using a microscope ("microscopeM×1200" commercially available from Nakaden Corporation). The case in which the generation of oily substances on the surface was confirmed was evaluated as "x" and the case in which the generation of oily substances on the surface was not confirmed was evaluated as "○."

TABLE 1

|  |  | Example | | | | | | Comparative Example | | | | |
| --- | --- | --- | --- | --- | --- | --- | --- | --- | --- | --- | --- | --- |
|  |  | 1 | 2 | 3 | 4 | 5 | 6 | 1 | 2 | 3 | 4 | 5 |
| Binder | NBR<1> (Amount of AN 41.5) | 100 | — | — | 100 | 100 | 100 | — | 100 | 100 | 100 | 100 |
|  | NBR<2> (Amount of AN 35.0) | — | 100 | — | — | — | — | — | — | — | — | — |
|  | NBR<3> (Amount of AN 48.0) | — | — | 100 | — | — | — | — | — | — | — | — |
|  | NBR<4> (Amount of AN 19.5) | — | — | — | — | — | — | 100 | — | — | — | — |
| Ion-conducting agent | Ion-conducting agent<1> (P type) | 3.0 | 3.0 | 3.0 | — | 3.0 | 3.0 | 3.0 | — | 3.0 | 3.0 | — |
|  | Ion-conducting agent<2> (Py type) | — | — | — | 3.0 | — | — | — | — | — | — | — |
|  | Ion-conducting agent<3> (N type) | — | — | — | — | — | — | — | 3.0 | — | — | — |
| Electric charge regulator | Electric charge regulator<1> (Si, N+) | 2.0 | 2.0 | 2.0 | 2.0 | — | — | 2.0 | 2.0 | — | — | 2.0 |
|  | Electric charge regulator<2> (F, N+) | — | — | — | — | 2.0 | — | — | — | — | — | — |
|  | Electric charge regulator<3> (Si, F, N+) | — | — | — | — | — | 2.0 | — | — | — | — | — |
|  | Electric charge regulator<4> (Si) | — | — | — | — | — | — | — | — | 2.0 | — | — |
| Crosslinking agent |  | 20 | 20 | 20 | 20 | 20 | 20 | 20 | 20 | 20 | 20 | 20 |
| Toner electric chargeability | LL environment | ○ | ○ | ○ | ○ | ○ | ○ | x | x | x | x | x |
|  | HH environment | ○ | ○ | ○ | ○ | ○ | ○ | x | x | x | x | x |
| Bleed resistance |  | ○ | ○ | ○ | ○ | ○ | ○ | x | ○ | ○ | ○ | ○ |

In the examples, the surface layer of the development roller contained a binder made of NBR having an acrylonitrile amount of 30 mass % or more, an ion-conducting agent made of at least one selected from among phosphonium salts and pyridinium salts, an electric charge regulator made of an acrylic polymer having a silicone group or a fluorine-containing group, and a cationic group. On the other hand, in Comparative Example 1, the acrylonitrile amount of NBR in the binder was 19.5 mass %. In Comparative Example 2, the ion-conducting agent was a quaternary ammonium salt. In Comparative Example 3, the electric charge regulator had no cationic group. In Comparative Example 4, no electric charge regulator was added. In Comparative Example 5, no ion-conducting agent was added. Based on such examples and comparative examples, it can be understood that, according to the present application, the value of Q/M was in an appropriate range, and bleed resistance was excellent so that an increase in the electric charge of the toner was minimized. In Comparative Example 1, since bleed resistance was poor and electric charge regulation was not possible, an increase in the electric charge of the toner was not minimized. In Comparative Examples 2 and 3, the value of Q/M was outside of an appropriate range. Also in Comparative Examples 4 and 5, the value of Q/M was outside of an appropriate range.

While embodiments and examples of the present application have been described above, the present application is not limited to the embodiments and examples, and various modifications can be made without departing from the spirit and scope of the present application.

The invention claimed is:

1. An electrophotography device development roller comprising a shaft, an elastic layer formed on an outer circumference of the shaft, and a surface layer formed on an outer circumference of the elastic layer,
wherein the surface layer contains the following (a) to (c):
(a) a binder made of an acrylonitrile-butadiene rubber having an acrylonitrile amount of 40 mass % or more,
(b) an ion-conducting agent made of at least one selected from among phosphonium salts and pyridinium salts, wherein the ion-conducting agent (b) is a phosphonium salt represented by the following General Formula (1):

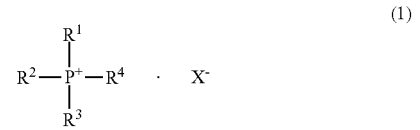

(1)

in Formula (1), $R^1$ to $R^3$ are an organic group having 1 to 4 carbon atoms, $R^4$ is an organic group having 4 to 12 carbon atoms, and $X^-$ is an anion; and
(c) an electric charge regulator made of an acrylic polymer having a silicone group or a fluorine-containing group, and a cationic group, wherein the electric charge regulator (c) is an electric charge regulator made of an acrylic polymer having a silicone group and a cationic group, and the cationic group of the electric charge regulator (c) is a quaternary ammonium cation.

* * * * *